United States Patent
Zarraga et al.

(10) Patent No.: US 9,195,343 B1
(45) Date of Patent: Nov. 24, 2015

(54) FORCE-SENSING RESISTOR SENSOR AND APPLICATIONS

(71) Applicant: Amazon Technologies, Inc., Reno, NV (US)

(72) Inventors: John Aaron Zarraga, San Francisco, CA (US); Jung Sik Yang, Santa Clara, CA (US); Edward Albert Liljegren, San Francisco, CA (US); Ilya Daniel Rosenberg, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 105 days.

(21) Appl. No.: 14/038,307

(22) Filed: Sep. 26, 2013

(51) Int. Cl.
  G06F 3/045 (2006.01)
  G06F 3/041 (2006.01)
  G01L 1/22 (2006.01)

(52) U.S. Cl.
  CPC ............... *G06F 3/0418* (2013.01); *G01L 1/22* (2013.01)

(58) Field of Classification Search
  CPC ........... G06F 3/016; G06F 3/01; G06F 3/044; G06F 3/045; G06F 3/0412; G01L 1/22
  USPC .................................................. 345/173–174
  See application file for complete search history.

(56) References Cited

U.S. PATENT DOCUMENTS

| | | | | |
|---|---|---|---|---|
| 5,440,237 | A * | 8/1995 | Brown et al. ................. | 324/601 |
| 2006/0007172 | A1 * | 1/2006 | Baker et al. ................... | 345/173 |
| 2009/0256817 | A1 * | 10/2009 | Perlin et al. .................. | 345/174 |
| 2014/0055406 | A1 * | 2/2014 | Hong et al. ................... | 345/174 |

OTHER PUBLICATIONS

U.S. Appl. No. 13/792,481, filed Mar. 11, 2013, Rosenberg et al.

* cited by examiner

*Primary Examiner* — Towfiq Elahi
(74) *Attorney, Agent, or Firm* — Weaver Austin Villeneuve & Sampson LLP

(57) ABSTRACT

An FSR assembly includes one or more active areas configured to respond to incident force by changing resistance. The FSR assembly also includes a test area constructed from the same FSR material as the active area(s), but for which the resistance remains substantially constant despite incident force on the assembly.

19 Claims, 12 Drawing Sheets

FORCE-SENSING RESISTOR SENSOR AND APPLICATIONS

BACKGROUND

Force-sensing resistors (FSRs) are typically constructed using conductive polymers that change resistance in a predictable manner with the application of force to the polymers. FSRs are typically configured as a polymer thick film or ink that can be applied by screen printing. The polymer includes both electrically conducting and non-conducting particles suspended in a matrix. The application of force to the surface of the polymer film alters the particle density of the film, lowering its resistance. FSRs are used to implement touch and force sensors for a wide variety of applications.

DETAILED DESCRIPTION

Figure 1:
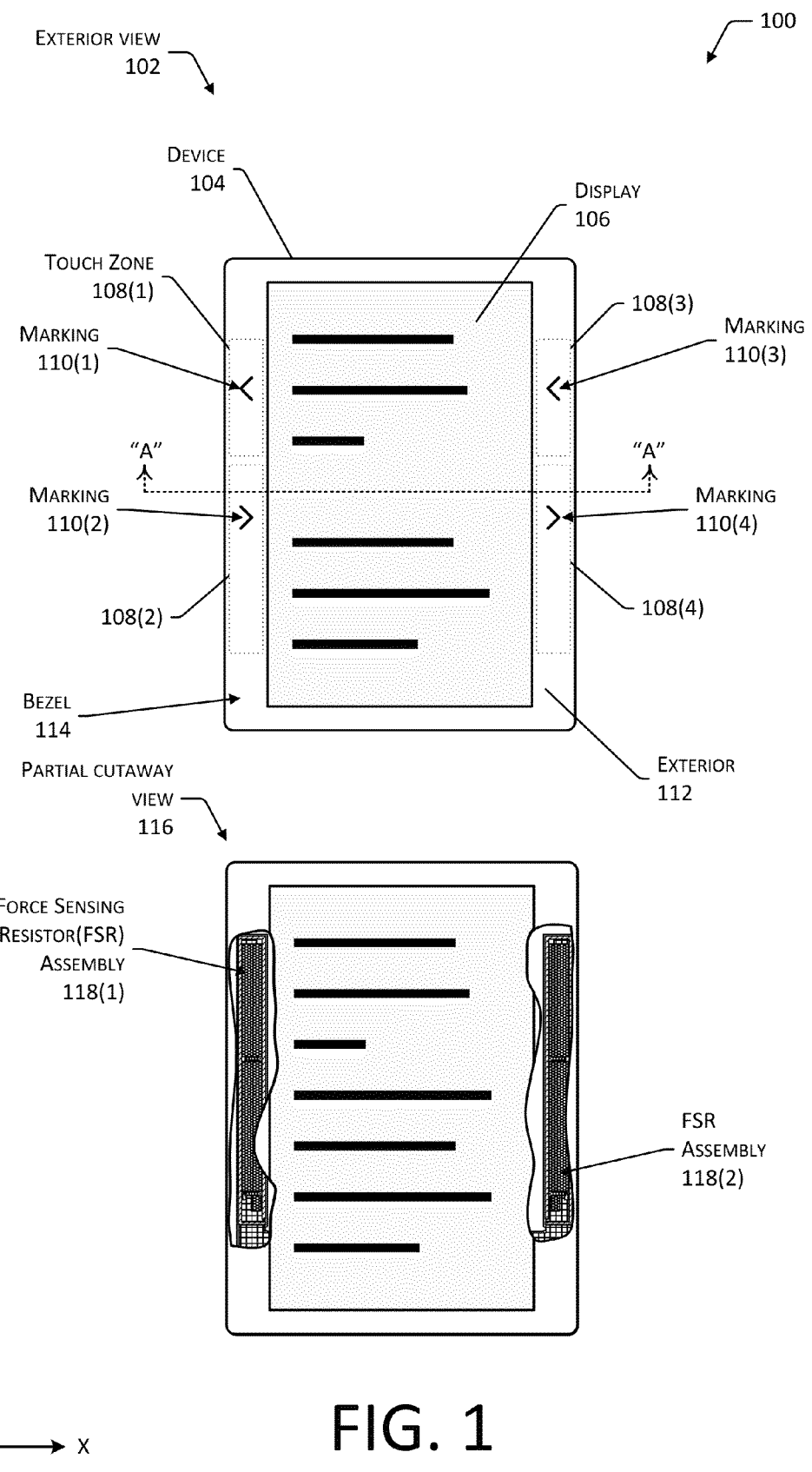
FIG. 1 illustrates an example of a device configured with FSR assemblies to accept user input at multiple touch zones.

FSR assemblies are described which include one or more active areas configured to respond to incident force by changing resistance. The FSR assemblies also include a test area (also referred to herein as a test patch) constructed from the same FSR material as the active area(s), but for which the resistance remains substantially constant despite incident force on the assembly. There are a variety of applications for which an FSR assembly with such a test patch may be useful.

For example, the resistance and the sensitivity to force of an FSR material may vary over time, with usage, and/or in response to environmental conditions, e.g., temperature, humidity, pressure, etc. Because of this drift, the operation of an FSR assembly incorporating such materials may become compromised, e.g., the dynamic range might be compressed. The ability to track changes in the resistance of a test patch associated with the sensor can provide the basis for modifying one or more operational parameters of the assembly (or a device in which the assembly is included) to compensate for the drift.

In another example, the test patch may be used as a way of identifying the type or manufacturer of an FSR assembly, or the type of FSR material in such an assembly. Such an ability might be useful for a variety of reasons. For example, FSR assemblies are typically based on voltage dividers in which the FSR material of the assembly is one of two resistances; the other being a pull-down resistance selected to maximize the sensitivity, i.e., dynamic range, of the assembly. The appropriate pull-down resistance may vary considerably depending on the type or manufacturer, or the type of FSR material. Being able to measure the resistance of the test patch (or a voltage or current dependent on the resistance) can therefore guide the selection of an appropriate pull-down resistance when configuring the assembly. And as will be discussed, further advantages or benefits may be realized as a result of this capability.

Specific implementations of FSR assemblies incorporating test patches will now be described with reference to the accompanying figures. The described implementations are depicted as being part of a particular type of electronic device. It should be noted, however, that the described implementations and the device in which they are incorporated are merely examples of the wide range of FSR assemblies and devices contemplated. The scope of the invention should therefore not be limited with reference to these examples.

The specific FSR assemblies described herein may be implemented in a very low profile configuration, e.g., having an overall thickness or height of less than 250 micrometers. Such assemblies may be configured to detect incident applied forces which result in deflections of a portion of the assemblies. Due to the characteristics of the assemblies, very small deflections may be detected. For example, in some implementations an FSR assembly may detect applied forces which result in a deflection of as little as 5 microns.

One or more of the FSR assemblies may be arranged beneath a structure, such as a portion of an exterior of a device in which each such assembly is a component. In one implementation, a bezel or edge may extend around or along a perimeter of a device such as a tablet computer, e-reader device, and so forth. For example, the bezel may be above or in front of the FSR assembly. The FSR assembly may be coupled to at least a portion of this bezel. The portion of the bezel to which the FSR assembly is coupled may be a single unbroken piece of material, such as a piece of glass, plastic, metal, and so forth. In one implementation a single piece of cover glass may be extended beyond the edges of a display panel, and may extend to a corresponding exterior back portion of the device to form the bezel. Because the FSR assembly is able to detect incident applied forces which result in very small deflections, the FSR assembly is able to detect applied forces which are transmitted by the bezel material.

According to a particular implementation described herein, an FSR assembly is configured with one or more touch zones. These touch zones are discrete areas within which an applied force may be detected. Different touch zones or combinations of touch zones may be associated with different actions. For example, a first touch zone may be assigned the action of a forward page turn while a second touch zone may be assigned the action of a backward page turn. A test patch implemented as described herein is included in each FSR assembly.

FIG. 1 depicts views 100 of an illustrative device. An exterior view 102 of a device 104, such as an e-reader device configured to present electronic books ("e-books"), is depicted. In some implementations the device 104 may include one or more displays 106. The device 104 may also have one or more touch zones 108(1), 108(2), . . . , 108(n). In the depicted example, n=4. The touch zones 108 are areas upon which an incident applied force, such as a user's touch, may be detected. Particular touch zones 108 may be assigned particular functions. Markings 110 or other indicia may be provided to indicate the position, function, and so forth of the touch zones 108. The markings may include graphics, text, or other features such as ridges or bumps. The markings may be provided as decals, paint, etching, deposited material, ridges, bumps, etchings, and so forth.

The device 104 includes an exterior 112. The exterior 112 may be in one or more pieces and is configured to at least partially enclose the components of the device 104. In one implementation the exterior 112 may comprise a front cover piece and a back cover piece. The front cover piece is that portion which is proximate to the user during typical usage while the back cover piece is that portion which is distal to the user during typical usage. The front cover piece of the exterior 112 may be configured as a single unbroken piece of material. This material may include glass, plastic, metal, and so forth. In one implementation the front cover piece may comprise a single piece of material such as cover glass which extends beyond the edges of the display 106 and matches a corresponding back cover piece. The area which extends beyond the edges of the display 106 may be designated as a bezel 114.

One or more of the touch zones 108 may reside at least partly within the bezel 114. For example, as depicted here two touch zones 108(1) and 108(2) are arranged along a left-hand edge of the device 104 in the bezel 114, while two additional touch zones 108(3) and 108(4) are arranged along a right-hand edge of the device 104 in the bezel 114.

A partial cutaway view 116 of device 104 depicts force sensing resistor ("FSR") assemblies 118(1) and 118(2) beneath the left- and right-hand portions of the bezel 114. Each FSR assembly 118 may provide for one or more touch zones 108. In this illustration, each FSR assembly 118 provides for two touch zones, i.e., touch zones 108(1) and 108(2) of FSR assembly 118(1), and touch zones 108(3) and 108(4) of FSR assembly 118(2).

In some implementations, one or more of the FSR assemblies 118 may be arranged proximate to or underneath other elements, such as the display 106. For example, the display may extend almost entirely to the edge of the device 104 and the FSR assembly 118 may be arranged behind the display 106. Pressure applied to the display 106 in the touch zone 108 may thus be detected by the underlying FSR assembly 118.

It should be noted that the figures in this disclosure are illustrative. In some instances various features have been exaggerated in size for clarity of illustration. The figures are not necessarily to scale, and may not necessarily be proportionate with one another.

Figure 2:
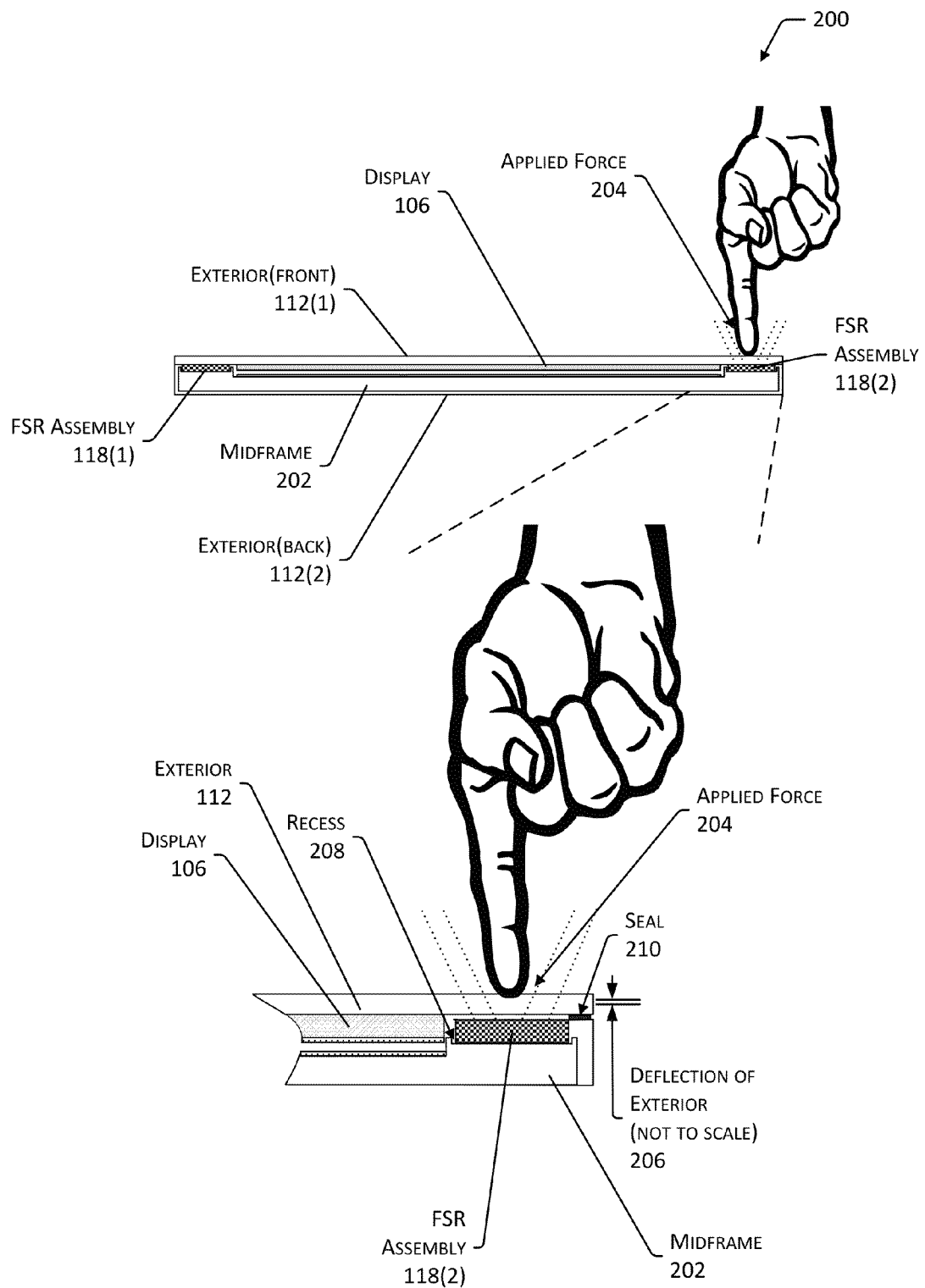
FIG. 2 is a cross-sectional, enlarged view of the device of FIG. 1 and its FSR assemblies.

FIG. 2 is a cross-sectional side view 200 and enlargement of the device of FIG. 1 and the FSR assemblies 118 within. This cross section is along the line indicated by broken line "A-A" in FIG. 1, i.e., along the X axis. In this illustration, the exterior (front) 112(1) is depicted. Underneath or behind the exterior 112(1) is the display 106. Underneath or behind the display 106 is a midframe 202 or other internal structure. The midframe 202 acts at least in part as a structural member, providing an attachment or mounting point for one or more components of the device 104. Arranged between the exterior 112(1) and the midframe 202 are the FSR assemblies 118(1) and 118(2).

The user may provide an applied force 204, such as with a touch or a pinch on the device 104. The applied force 204 may be exerted on different portions of the device, such as on the display 106, the bezel 114, or other portions of the device 104. The touch may use one or more fingers, or be imparted by a device or tool such as a stylus. The applied force 204 results in a deflection 206 of the exterior 112(1), 112(2), or both. Due to the sensitivity of the FSR assembly 118, very small deflections 206 may result in measureable forces. In one implementation, the deflection 206 may be at least between 5 and 15 microns (millionths of a meter). Rigid materials such as glass, metal, plastic, and so forth as used in the exterior 112 deflect or deform under the applied force 204 to some degree. The deflection 206 of the exterior 112 and the transmission of the applied force 204 to the FSR assembly 118 are sufficient to generate a signal which may be used to designate activation. Depending upon the material, thickness, and other physical factors, this deflection may be a localized phenomenon, such as within a few mm or centimeters. As a result, deflection of the exterior 112(1) proximate to the touch zone 108(1) may not result in deflection at the touch zone 108(3) on another side of the device 104 which is detectable by the corresponding FSR assembly 118(2).

The midframe 202 may be configured with a recess 208 or other feature configured to accommodate at least a portion of the FSR assembly 118. The midframe 202 may include other features such as alignment or registration features configured to aid assembly of the device 104. The FSR assembly 118 may be mechanically coupled to the exterior 112(1), the midframe 202, or both. In one implementation, the FSR assembly 118 may be adhered to the midframe 202 using an adhesive.

In some implementations a seal 210 may be arranged along a perimeter of the exterior 112. The seal 210 may join two pieces of the exterior 112, join a portion of the exterior 112 to the midframe 202, the FSR assembly 118, or a combination thereof. In one implementation, the seal 210 may comprise an adhesive transfer tape or acrylic elastomer. Use of the seal 210 may increase compliance or deflection of the exterior 112 and improve sensitivity to the applied force 204 by the FSR assembly 118. The construction of a particular implementation of FSR assembly 118 is discussed in more detail below with reference to FIGS. 4-11.

Figure 3:
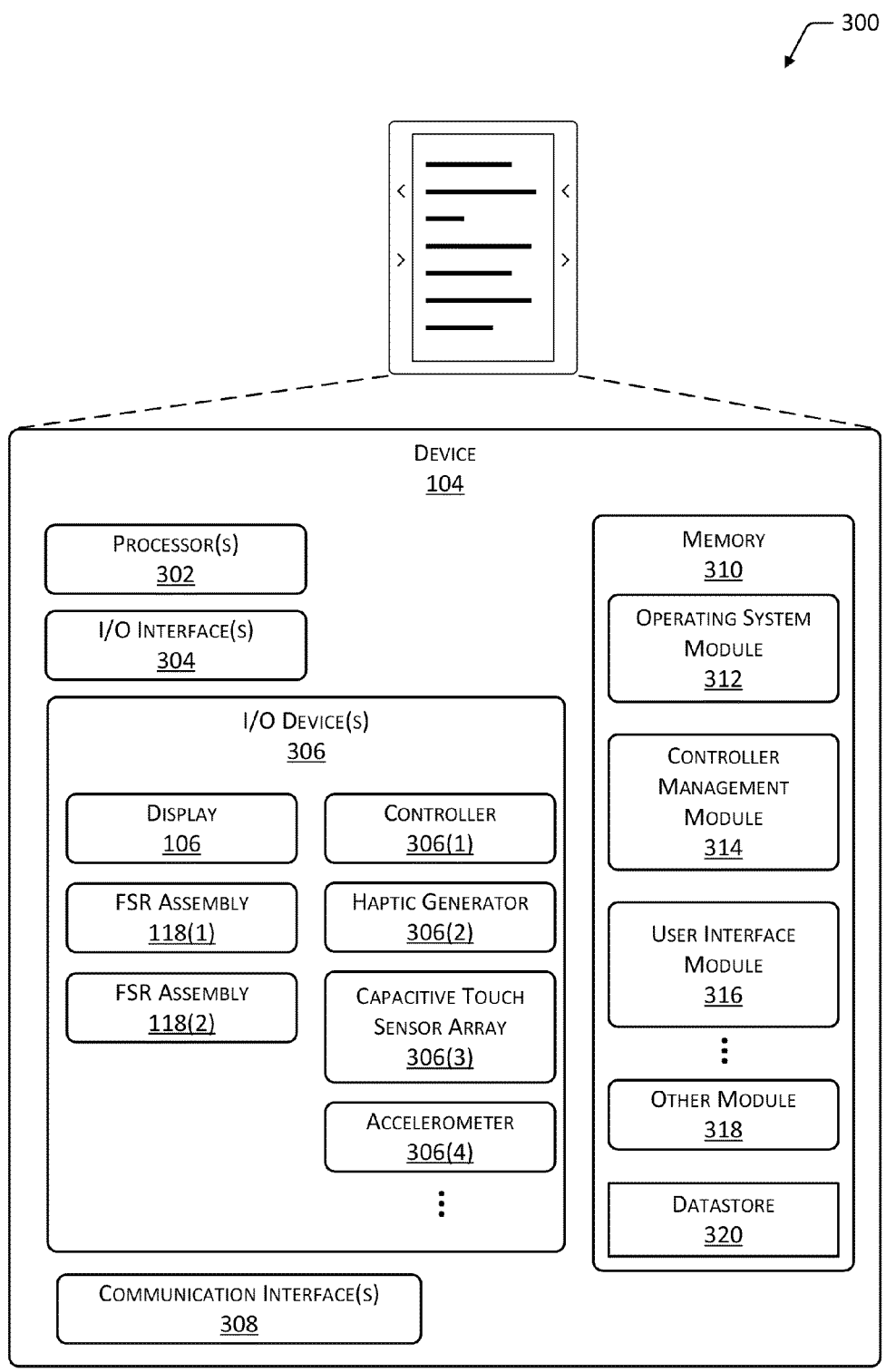
FIG. 3 is a block diagram of the device of FIG. 1 and various associated components including the FSR assemblies and a controller.

FIG. 3 is a block diagram 300 of the device 104. The device 104 may include one or more processors 302 configured to execute stored instructions. The processors 302 may comprise one or more cores. The device 104 may include one or more input/output ("I/O") interface(s) 304 to allow the device 104 to communicate with other devices. The I/O interfaces 304 may comprise inter-integrated circuit ("I2C"), serial peripheral interface bus ("SPI"), universal serial bus ("USB"), RS-232, media device interface, and so forth.

The I/O interface(s) 304 may couple to one or more I/O devices 306. The I/O device(s) 306 may include one or more displays 106, FSR assemblies 118, controllers 306(1), haptic generators 306(2), capacitive touch sensor arrays 306(3), accelerometers 306(4), motion sensors, orientation sensors, and so forth. The one or more displays 106 are configured to provide visual output to the user. The one or more displays 106 may comprise an electrophoretic or cholesteric material and may be configured to present an image using reflected light, ambient light, light from a front light, and so forth.

The FSR assemblies 118 as described above are configured to detect applied force such as, for example, force 204 of FIG. 2. The FSR assemblies 118 may be coupled to the controller 306(1). The controller 306(1) is configured to control and receive input from the FSR assembly 118 to determine the presence of the applied force 204, a magnitude of the applied force, and so forth. The controller 306(1) may be configured to designate one or more of the touch zones 108 have been activated. Based on this designation, the controller 306(1) may send a signal indicative of activated touch zones 108 to the one or more of the processors 302. In some implementations the controller 306(1) may also be coupled to and configured to drive the haptic generator 306(2) with one or more haptic output waveforms. The haptic output waveforms are configured to provide a particular haptic output from the haptic generator 306(2).

The capacitive touch sensor array 306(3) is configured to determine the location of a user's touch based on a change in electrical capacitance. The capacitive touch sensor array 306(3) may comprise a matrix of conductors which are scanned to determine a location of a touch within the matrix. Output from the capacitive touch sensor array 306(3) may be used in conjunction with output from the FSR assembly 118. For example, the FSR assembly 118 may provide data indicative of the magnitude of an applied force which is unavailable from the capacitive touch sensor array 306(3) alone.

The device 104 may also include one or more communication interfaces 308 configured to provide communications between the device 104 and other devices. Such communication interface(s) 308 may be used to connect to one or more personal area networks ("PAN"), local area networks ("LAN"), wide area networks ("WAN"), and so forth. For example, the communications interfaces 308 may include radio modules for a WiFi LAN and a Bluetooth PAN. The device 104 may also include one or more busses or other internal communications hardware or software that allow for the transfer of data between the various modules and components of the device 104.

As shown in FIG. 3, the device 104 includes one or more memories 310. The memory 310 comprises one or more non-transitory computer-readable storage media ("CRSM"). The CRSM may be any one or more of an electronic storage medium, a magnetic storage medium, an optical storage medium, a quantum storage medium, a mechanical computer storage medium and so forth. The memory 310 provides storage of computer readable instructions, data structures, program modules and other data for the operation of the device 104.

The memory 310 may include at least one operating system (OS) module 312. The OS module 312 is configured to manage hardware resources such as the I/O interfaces 304 and provide various services to applications or modules executing on the processors 302. Also stored in the memory 310 may be a controller management module 314, a user interface module 316, and other modules 318. The controller management module 314 is configured to provide for control and adjustment of the controller 306(1). For example, the controller management module 314 may be used to set user-defined preferences in the controller 306(1).

The user interface module 316 is configured to provide a user interface to the user. This user interface may be visual, audible, haptic, or a combination thereof. For example, the user interface module 316 may be configured to present an image on the display 106 and process the inputs of applied forces 204 at particular touch zones 108 to take particular actions, such as paging forward or backward in an e-book. The user interface module 316 may be configured to respond to one or more signals from the controller 306(1). These signals may be indicative of the magnitude of an applied force, the duration of an applied force, or both within a given touch zone 108. For example, the user interface module 316 may interpret a low magnitude (light touch) on the touch zone 108(4) as a command to present on the display 106 the next page in an e-book. In comparison, in that same touch zone, a high magnitude or heavy touch on the touch zone 108(4) may be interpreted as a command to change to the next chapter. Other modules 318 may be stored in the memory 310. For example, a rendering module may be configured to process e-book files for presentation on the display 106.

The memory 310 may also include a datastore 320 to store information. The datastore 320 may use a flat file, database, linked list, tree, or other data structure to store the information. In some implementations, the datastore 320 or a portion of the datastore 320 may be distributed across one or more other devices including servers, network attached storage devices and so forth. The datastore 320 may store information about one or more haptic output waveforms, user preferences, and so forth. The haptic output waveforms are configured to produce particular haptic effects when rendered by one or more of the haptic generators 306(2). Other data may be stored in the datastore 320 such as e-books, video content, and so forth.

While processors 302 and memory 310 are depicted here, it is understood that the FSR assembly 118 and the controller 306(2) may be used in other devices which lack these or other elements. For example, the FSR assembly 118 and the controller 306(2) may be used as a switch configured to control a wide variety of electronic and electro-mechanical systems including, for example, a table lamp or a kitchen appliance. The scope of the invention should therefore not be limited to the depicted implementations.

Figure 4:
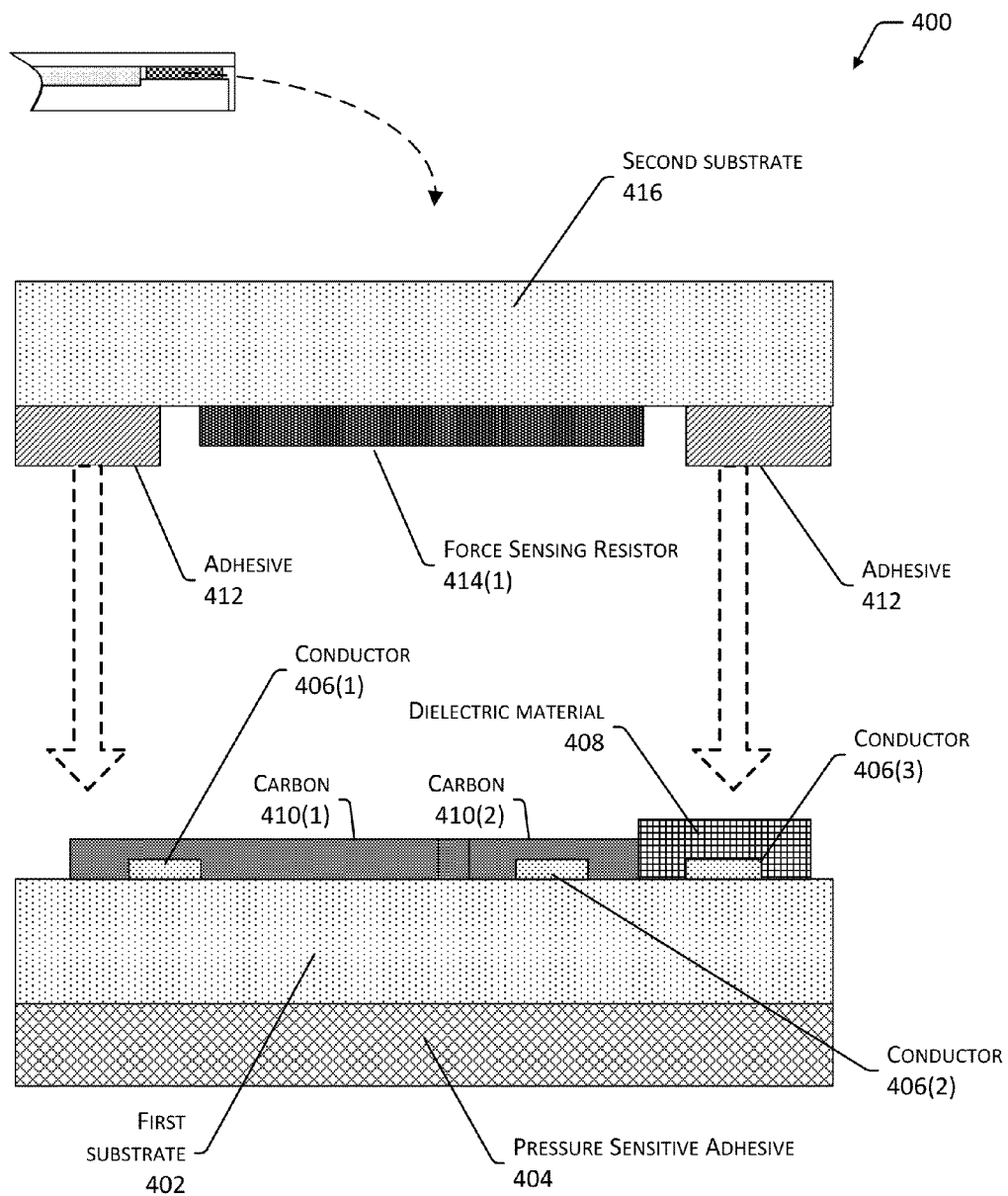
FIG. 4 is a first cross-sectional view of a specific implementation of an FSR assembly.

FIG. 4 is an enlarged cross sectional view 400 along the line "A-A" of the FSR assembly 118(2). The depicted portion of the FSR assembly 118(2) is that which is within one of the touch zones (e.g., 108(4) in the depicted cross section), and is thus sensitive to applied force. It will be understood that other portions of the FSR assembly 118, such as a connection pad, may have an alternative configuration.

For the purposes of discussion and not by way of limitation, the terms "above" and "below" or "front" and "back" are used relative to the Z axis indicated in the various figures. The Z axis is orthogonal to a primary plane of the FSR assembly 118(2), wherein the primary plane is defined by the two longest axes of the FSR assembly 118(2) which are orthogonal to one another.

A first substrate 402 is depicted. The first substrate 402 may comprise a polymer, printed circuit board, paper, an exterior casing of the device, an internal component such as a frame, and so forth. The first substrate 402 may be an electrical insulator at voltages used in the FSR assemblies 118. In one implementation the first substrate may comprise polyethylene terephthalate ("PET"). In one implementation, the first substrate 402 may have a thickness (as measured along the Z axis) of about 75 micrometers.

A pressure sensitive adhesive 404 is applied to the back of the first substrate 402. The pressure sensitive adhesive ("PSA") 404 may comprise ethylene-vinyl acetate, silicone rubbers, styrene block copolymers, and so forth. The PSA 404 may be used to adhere at least a portion of the FSR assembly 118 to the midframe 202. In one implementation, the PSA 404 may have a thickness (as measured along the Z axis) of about 50 micrometers. In some implementations, the PSA 404 may be omitted.

In this disclosure, the term "apply" or "applying" may include one or more processes involving vapor deposition, fluidic material deposition using a plurality of jets, physical vapor deposition, material transfer from a subsequently removed carrier, screen printing, lamination, selective laser sintering, and so forth. For example, the PSA 404 may be applied by spraying adhesive material onto the first substrate 402.

On the front of the first substrate 402, a plurality of conductors 406 are applied in a pattern configured to provide for one or more electrically discrete touch zones 108. In this illustration, three conductors 406(1)-(3) are depicted, suitable for a FSR assembly 118 with two electrically discrete touch zones 108. One conductor 406 may be provided for each of the touch zones 108, while one conductor 406 may be used as a common or ground. Each conductor 406 may comprise a conductive polymer, metal, and so forth. For example, in some implementations the conductor 406 may comprise copper, silver (e.g., silver nanowires (AgNW) coated with PEDOT:PSS), or aluminum.

One or more portions of dielectric material 408 may be applied to at least a portion of the one or more conductors 406. For example, as illustrated in this cross section, the conductor 406(3) to the right of the other conductors 406(1) and 406(2) is covered with the dielectric material 408. As will be discussed, at other cross sections along the Y-axis, the configuration of the dielectric material 408 may be different than that depicted in FIG. 4, e.g., covering others of the conductors. The dielectric material 408 may comprise a polymer, ceramic, aerogel, or other material which acts as an insulator at the voltages used in the FSR assembly 118.

One or more conductive carbon 410 traces or other structures (e.g., 410(1) and 410(2) in the depicted cross section) are applied atop at least a portion of the conductors 406 which are uncovered by the dielectric material 408. The carbon 410 traces are configured such that each of the traces electrically couple to a different conductor 406. In some cases, the conductive carbon 410 traces may also extend over at least portions of the top of the dielectric material 408. In other implementations the carbon 410 traces may be replaced with other materials, such as metals, electrically conductive polymers, quantum tunneling composites, and so forth.

An adhesive 412 may be applied atop the carbon 410 features and the dielectric material 408. The adhesive 412 may be arranged around at least a portion of a perimeter of the first substrate 402. The adhesive 412 may be deposited as one or more beads. In some implementations a small gap may be left in in the adhesive 412 around the perimeter to allow for equalization of air pressure between an interior of the FSR assembly 118 and the ambient atmosphere to avoid "ballooning" or crumpling. In another implementation the adhesive 412 or other portions of the FSR assembly 118 may be semipermeable to one or more atmospheric gases. In one implementation, the adhesive 412 may have a thickness (as measured along the Z axis) of about 15 micrometers and may have a width (as measured along the X axis) of about 1 mm.

One or more sections of force sensing resistor ("FSR") 414 material are applied to a second substrate 416, the combination of which is placed in contact with the carbon 410 features (e.g., 414(1) in the depicted cross section) and secured by adhesive 412. The FSR 414 material may be any material which exhibits a change in resistance (by itself or in combination with other materials) upon application of a force to the material. FSR materials suitable for use with FSR assemblies configured as described herein include, but are not limited to various types of commercially available and proprietary conductive ink (e.g., conductive inks from Henkel AG & Co. of Dusseldorf, Germany), as well as other types of materials such as, for example, carbon nanotubes and carbon nanobuds (doped to have a high resistance), carbon-embedded ESD sheets, etc. Each of the one or more sections of the FSR 414 material are such that each section electrically couples to two or more carbon 410 features. In one implementation, the FSR 414 may have a thickness (as measured along the Z axis) of about 50 micrometers and may have a width (as measured along the X axis) of about 1.5 mm.

The second substrate 416 may have a thickness (as measured along the Z axis) of about 75 micrometers. The second substrate 416 may comprise the same material as the first substrate 402. In one implementation, the first substrate 402 and the second substrate 416 may comprise a single piece, such a single piece which is at least partially folded, such that the first substrate 402 acts also as the second substrate 416 when assembly is complete.

In some implementations the second substrate 416 may be omitted. For example, the FSR assembly 118 without the second substrate 416 may be bonded to an interior surface of the exterior 112 of device 104.

In some implementations the first substrate 402, the PSA 404, the conductors 406, the dielectric material 408, and the carbon 410 may be fabricated as a unit. This unit may be designated a lower assembly. The remaining components described may be also be fabricated as a unit, which may be designated an upper assembly. The upper assembly and the lower assembly may be joined, as indicated by the arrows, to form the FSR assembly 118.

Figure 5:
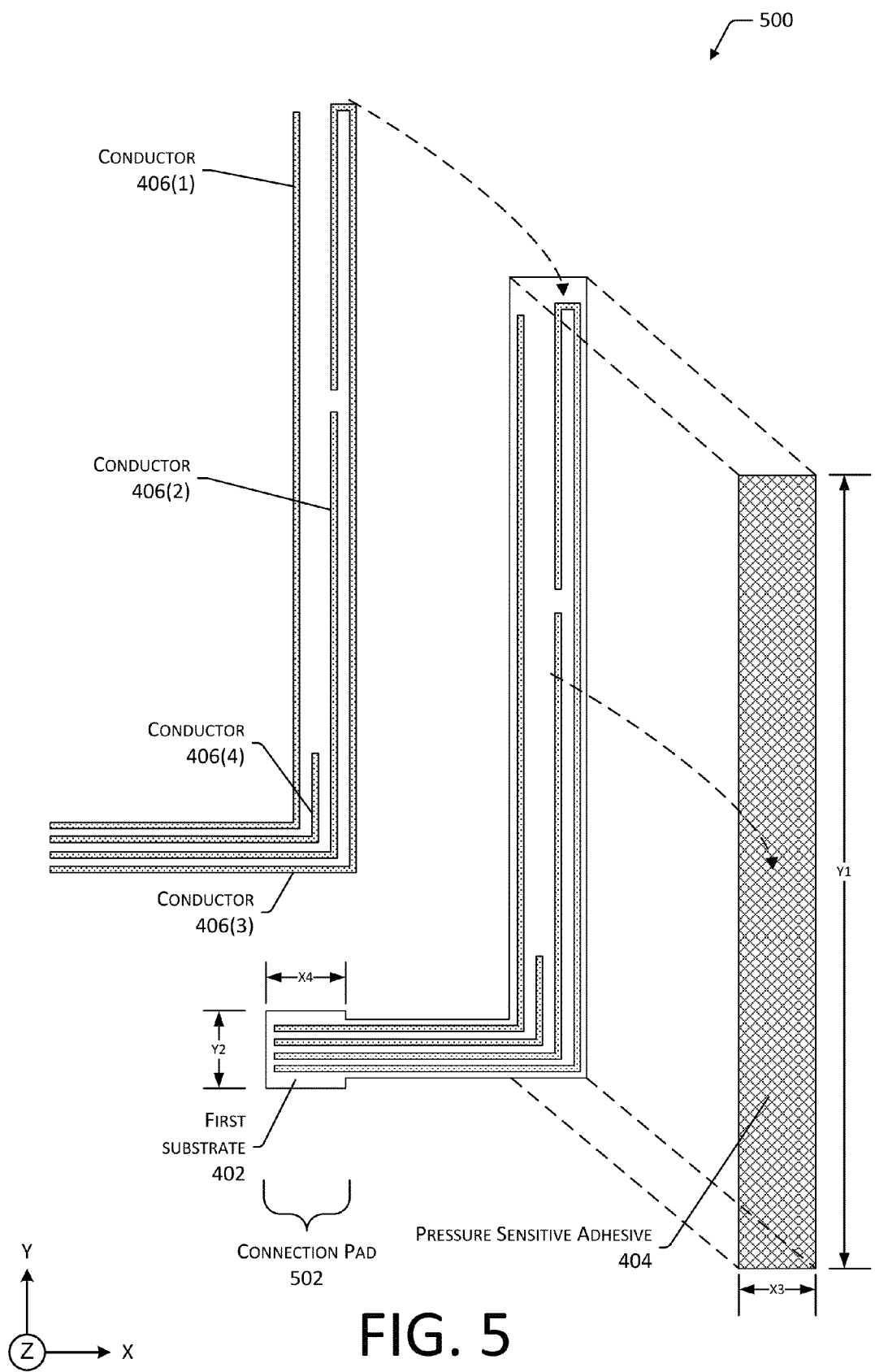
FIGS. 5-10 illustrate the relationships among the various layers and components of the FSR assembly of FIG. 4.

FIGS. 5-10 illustrate the various layers of the FSR assembly 118(2) as depicted in FIG. 4. FIG. 5 depicts a view 500 of the conductors 406(1)-406(3) and an additional conductor 406(4) as they may be applied to the first substrate 402. Also applied to the first substrate 402 on a side opposite the conductors 406 is the PSA 404. The PSA 404 may be formed as a sheet, ring, or other structure in the X-Y plane. As shown here, the PSA 404 is a contiguous sheet. In one implementation, the PSA 404 may have a width X3 of about 4 mm and a length Y1 of about 75 mm.

A portion of the first substrate 402 as depicted may be flared or expanded to form a connection pad 502. The connection pad 502 provides a point to couple the conductors 406 of the FSR assembly 118 to a controller, e.g., controller 306(1) of FIG. 3, pull-down resistances, and/or supply voltages. In this illustration the connection pad may have a width X4 of about 3 mm and a length Y2 of about 4 mm. In other implementations, the connection pad 502 may have a different shape.

Figure 6:
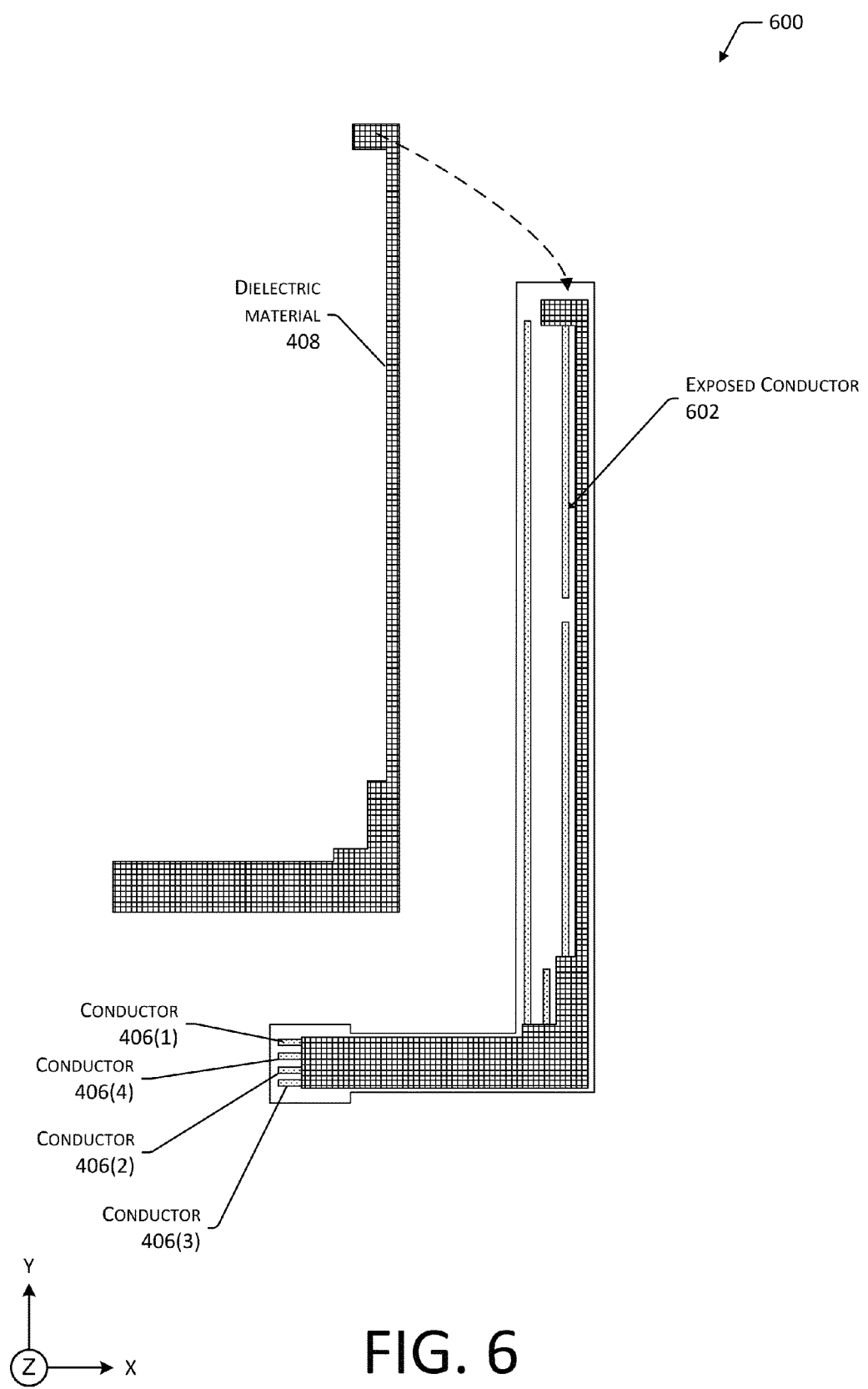

FIG. 6 illustrates application 600 of the dielectric material 408 atop the conductors 406 of FIG. 5. One or more pieces of dielectric material 408 may be applied atop the conductors 406 such that a plurality of exposed conductors 602 remain. In this illustration, a portion of each of the conductors 406(1), 406(2), 406(3) and 406(4) remains exposed.

Figure 7:
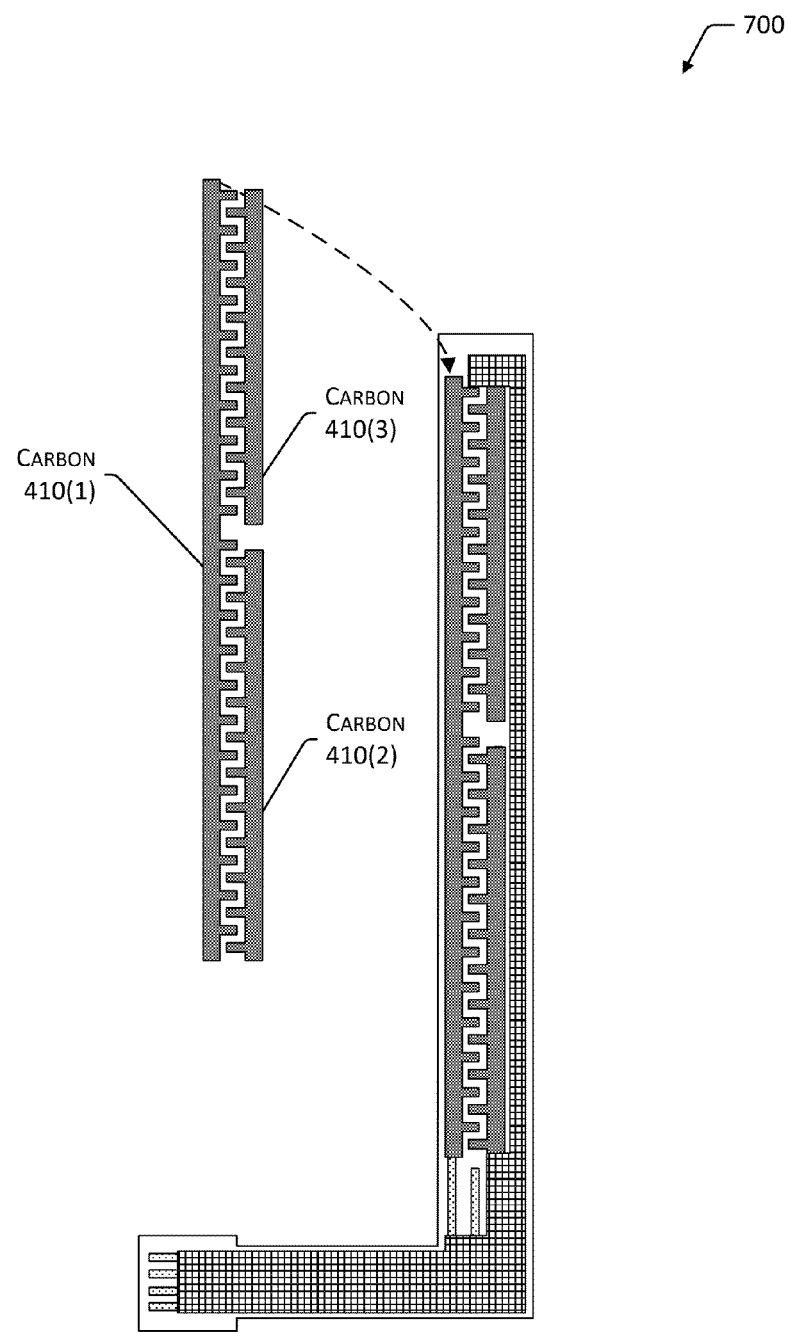

FIG. 7 illustrates application 700 of the carbon 410 atop the conductors 406 and the dielectric material 408, as depicted in FIG. 6. A plurality of carbon 410 traces are applied. A pattern described by the carbon 410 is configured such that a single portion of carbon couples to a single conductor 406. In this illustration, three carbon traces 410(1)-(3) are depicted as being coupled to conductors 406(1)-(3), respectively. These traces 410 are configured to provide complementary patterns, such as a serpentine or interlocking set of patterns such that the carbon 410 of different traces are not in electrical contact with each other.

Figure 8:
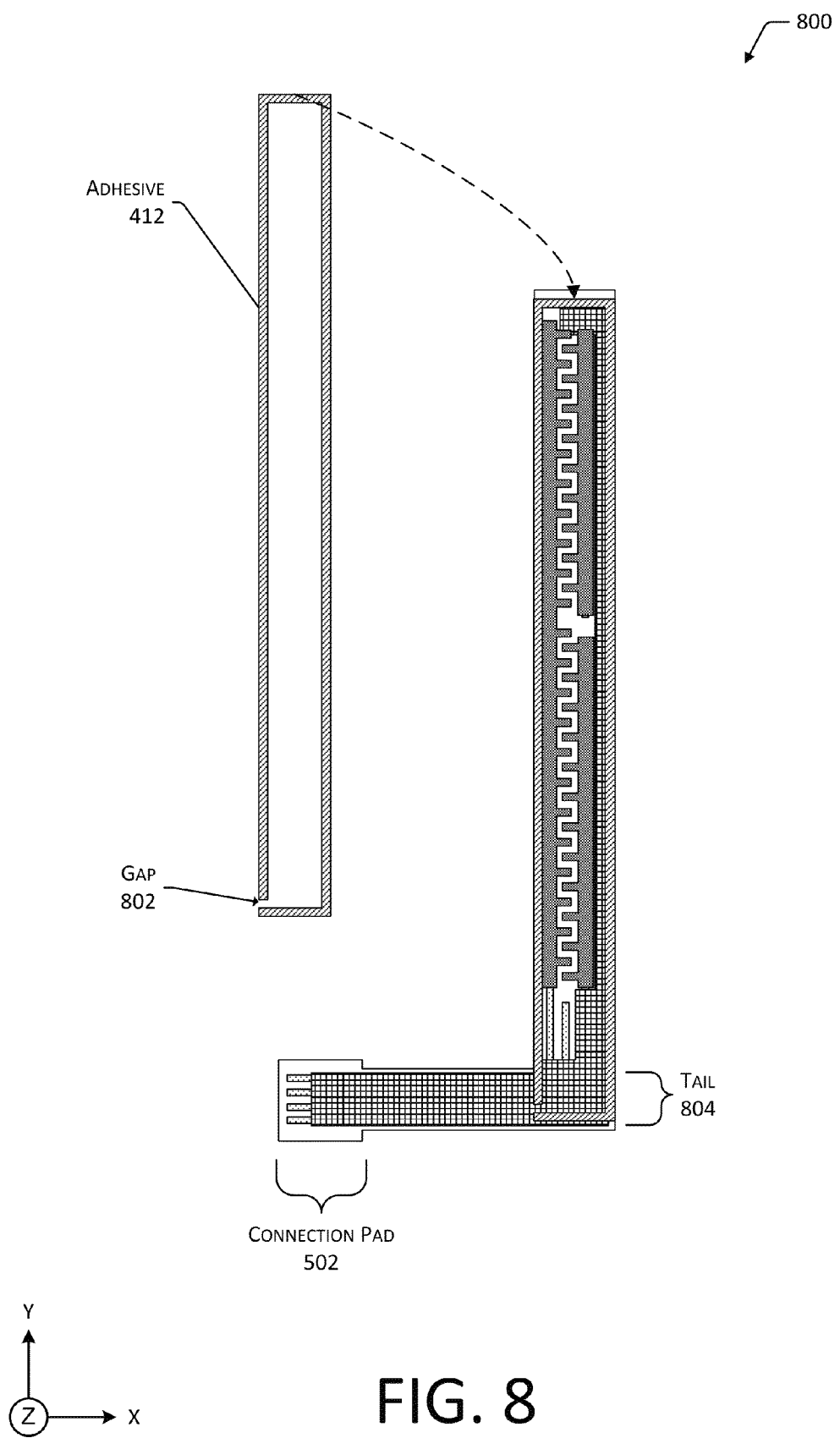

FIG. 8 illustrates application 800 of the adhesive 412 around a perimeter of the first substrate 402. The adhesive 412 may be arranged as a ring around the perimeter of the first substrate 402. The adhesive 412 may have a width along the X-axis of about 1 mm. As illustrated here, a small gap 802 may be provided in the adhesive 412. This gap 802 allows for pressure equalization between the interior of the FSR assembly 118 and the ambient atmosphere.

Figure 9:
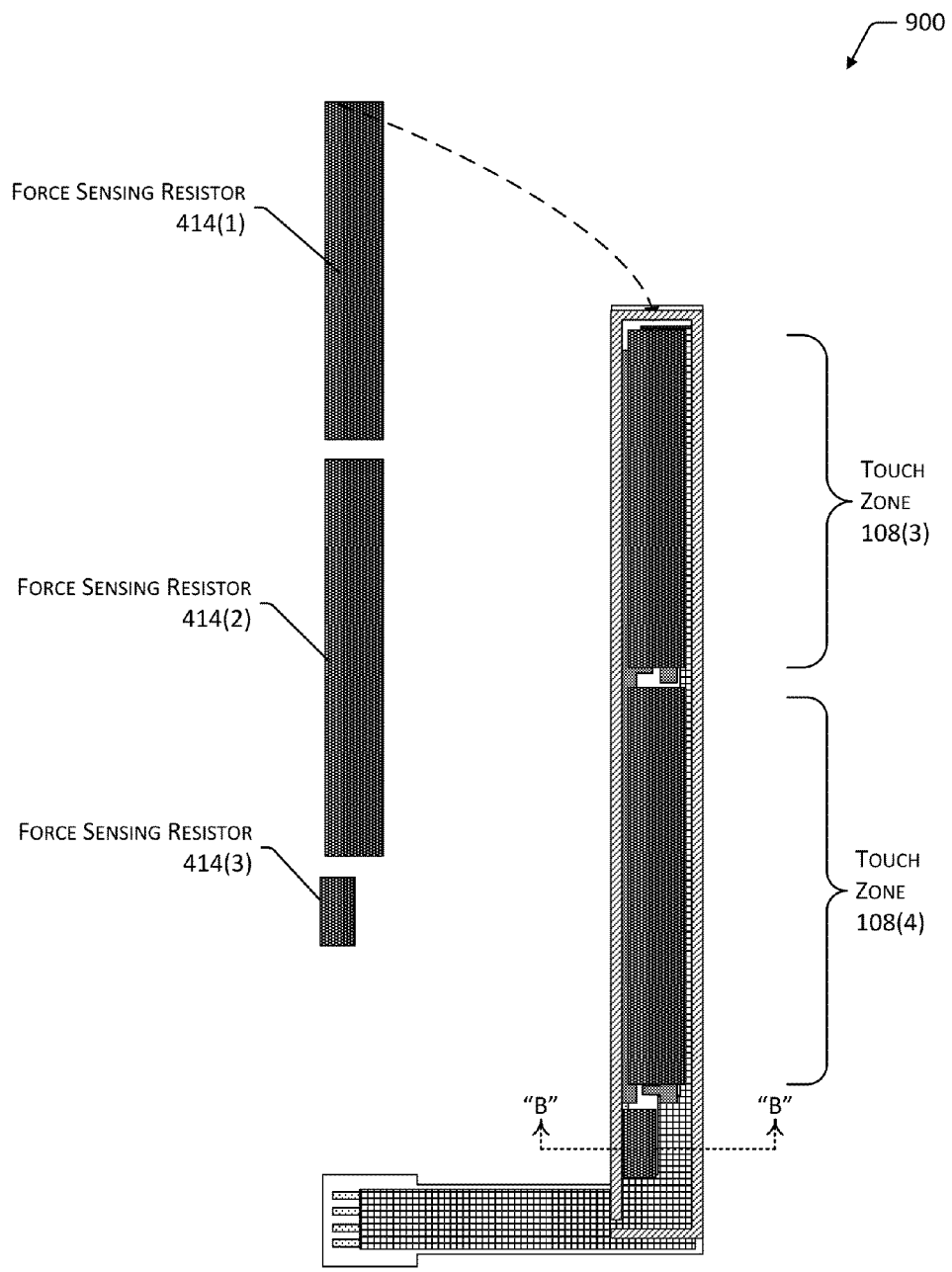

FIG. 9 illustrates placement 900 of the FSR 414 material. In this illustration, three portions of FSR material 414 are placed. Each of portions 414(1) and 414(2) is configured to come into electrical contact with two or more of the carbon 410 traces. For example, in this illustration, the FSR 414(1) is in electrical contact with the carbon 410(1) and 410(3), while the FSR 414(2) is in electrical contact with the carbon 410(1) and 410(2). Each touch zone 108 is defined by a different and electrically separate portion of FSR 414 material. In this illustration, the area defined by the FSR 414(1) defines the touch zone 108(3), while the area defined by the FSR 414(2) defines the touch zone 108(4). These are the "active areas" of FSR assembly 118(2) in that they are configured to respond to force as described above. As will be discussed, FSR 414(3) corresponds to the test area or test patch portion of the FSR assembly.

Figure 10:
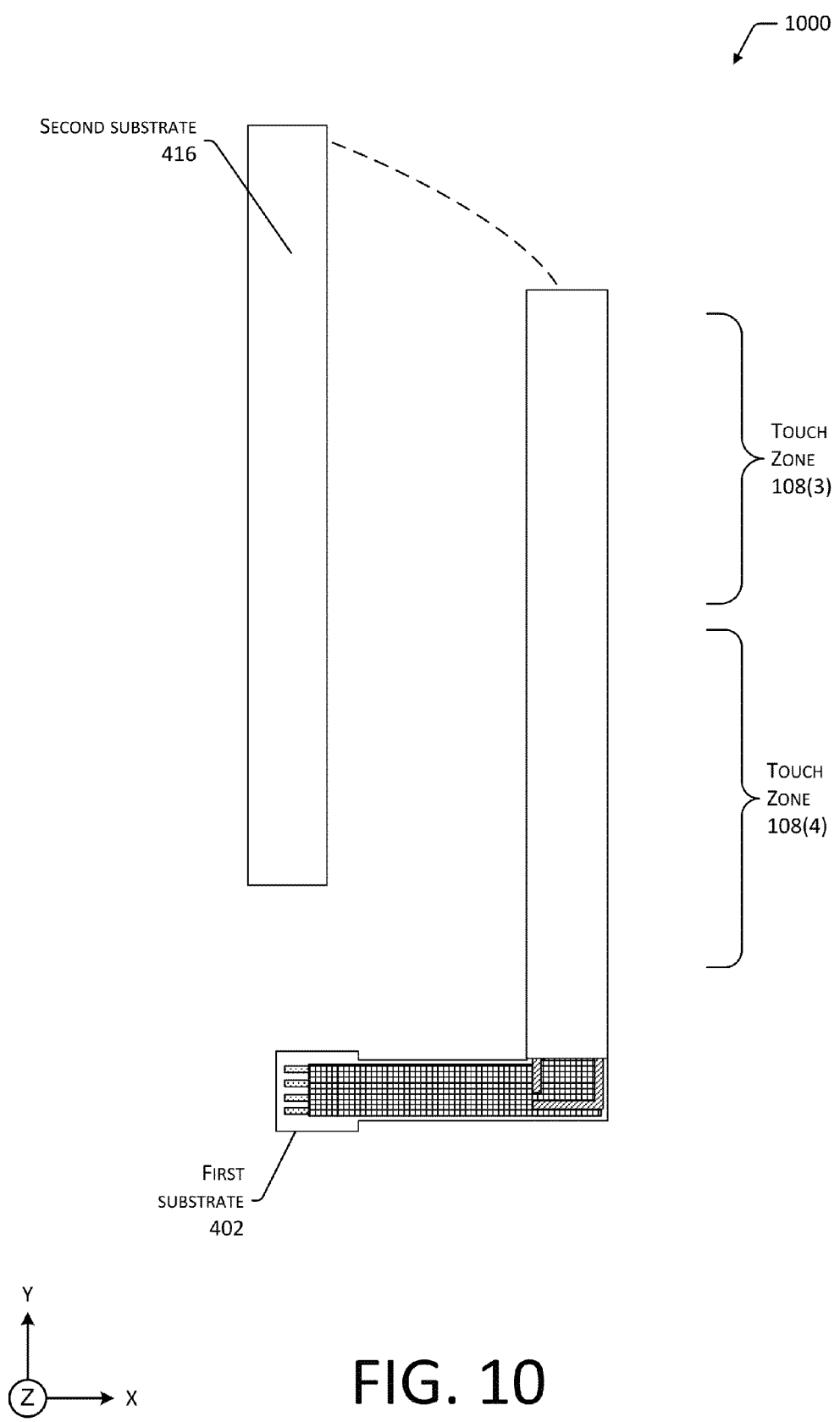

FIG. 10 illustrates application 1000 of the second substrate 416 atop the FSR 414 of FIG. 9 and the adhesive 412 of FIG. 8. With the second substrate 416 in place, the FSR assembly 118 may be connected to the controller 306(1).

During operation each of conductors 406(2) and 406(3) is coupled to a positive supply voltage (not shown) and conductor 406(1) is pulled down to ground or a negative supply by one or more pull-down resistors (not shown) which form voltage dividers with the FSR material associated with each touch zone. For example, FSR 414(1) associated with touch zone 108(3) is coupled to the positive supply (via carbon 410(3) and conductor 406(3)) and to conductor 406(1) (via carbon 410(1)) to form a voltage divider with a corresponding pull-down resistor for which the voltage (or current) measurable on conductor 406(1) varies with force on touch zone 108(3). Similarly FSR 414(2) associated with touch zone 108(4) is coupled to the positive supply (via carbon 410(2) and conductor 406(2)) and to conductor 406(1) (via carbon 410(1)) to form a voltage divider with a corresponding pull-down resistor for which the voltage (or current) measurable on conductor 406(1) varies with force on touch zone 108(4). Coupling of the various conductors and/or pull-down resistors to supply voltages or ground may be under control of a controller, e.g., controller 306(1), such that only one voltage divider is active at a time.

During operation FSR 414(3) of the test patch is coupled to the positive supply (via conductor 406(4)), and is also coupled to conductor 406(1) to form a voltage divider with a corresponding pull-down resistor. However, unlike the voltage dividers associated with touch zones 108(3) and 108(4), the voltage (or current) measurable on conductor 406(1) remains substantially constant with force on the test patch. This may be understood with reference to the cross-sectional views of FIGS. 4 and 11.

Figure 11:
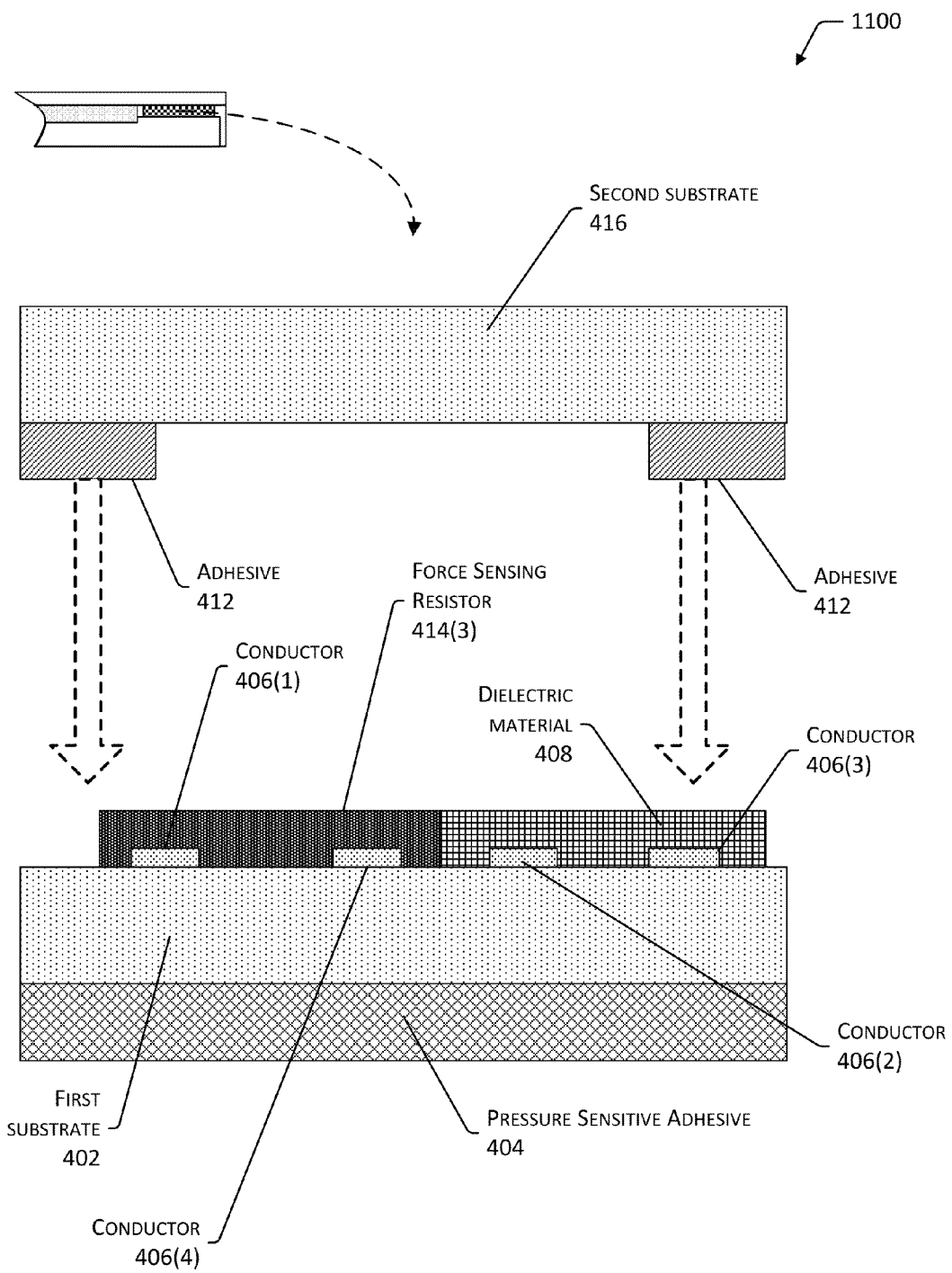
FIG. 11 is a second cross-sectional view of the FSR assembly of FIGS. 4-10.

FIG. 11 is an enlarged cross sectional view 1100 along the line "B-B" of the FSR assembly 118(2) as shown in FIG. 9 which cuts through the test patch area that includes FSR 414(3). View 1100 shows many of the features also shown in view 400 of FIG. 4 such as, for example, the first and second substrates 402 and 416, adhesives 404 and 412, conductors 406(1)-406(3), and dielectric 408. In addition, test patch conductor 406(4) and test patch FSR 414(3), not represented in FIG. 4, are shown. And in contrast with view 400 of FIG. 4, this cross section shows dielectric 408 over both of conductors 406(2) and 406(3). Another contrast is that FSR 414(3) is applied directly on conductors 406(1) and 406(4). It is this relationship of the FSR material to these conductors that results in the resistance between the conductors (and therefore the voltage or current measurable at conductor 406(1)) remaining substantially constant even in the presence of a force on second substrate 416.

Referring to FIG. 4, the change in resistance resulting from force exerted on touch zone 108(4) is largely due to a surface effect between FSR 414(1) and carbon 410(1) and 410(2) rather than as a result of a bulk property of the FSR material. That is, because the FSR material mechanically contacts the underlying carbon, the decrease in resistance (or increase in conductivity) occurs at the interface of the FSR material and the underlying carbon as the mechanical contact become more intimate under pressure. By contrast, and as illustrated in FIG. 11, test patch FSR 414(3) is applied (e.g., printed or deposited) directly over conductors 406(1) and 406(4) so that, even in the presence of force exerted on the FSR material (e.g., via substrate 416), the relationship between the FSR material and the underlying conductor does not change appreciably and therefore, the resistance of the bulk material between the two conductors remains substantially constant.

It should be noted that the geometries of and relationships between or among the active area(s) (e.g., touch zones 108) and a test patch of an FSR assembly designed as described herein may vary considerably. For example, there might be only a single active area, or more than two active areas. Or, the test patch might not share a common conductor with the active area(s). Or, the FSR materials and other components of the FSR assembly might have different shapes and/or physical arrangements, i.e., the location of the test patch may be just about anywhere on the FSR assembly relative to the active area(s). Or, an active area might be configured as a voltage divider while the test patch is configured as a single resistance (e.g., a test patch measurement might be a resistance measurement rather than a voltage or current measurement). And as mentioned above, there are a variety of applications for FSR assemblies that include both active areas and test areas or test patches as described herein.

For example, a test patch may be used to identify the type or source of an FSR assembly. That is, if the types of FSR materials used by specific manufacturers of such assemblies is known, measurement of the test patch resistance (or a voltage or current dependent on the test patch resistance) can be used like a signature to identify the type or source of the assembly. This might be useful, for example, to identify counterfeit FSR assemblies.

Such information may also be used to set operating parameters for the assembly such as, for example, selection of pull-down resistor(s) for a voltage divider(s). That is, as discussed above with reference to specific implementations, the FSR material in an active area of an FSR assembly may form a voltage divider with a corresponding pull-down resistor. Selection of the correct value of pull-down resistor is important for setting the operation point of the FSR assembly to maximize its dynamic range which is typically limited by the voltage being divided, e.g., a 1.8 volt supply. Such an approach may obviate the need for separate firmware, or a separate manually configured circuit board in the electronic system of which the assembly is a component for each FSR assembly type. According to a particular class of implementations in which one or more FSR sensor assemblies as described herein are components in a tablet computing device (e.g., device 104 of FIG. 1), one or more data tables specifying pull-down resistors or resistor values for each type of FSR assembly may be stored in device memory for configuration of the FSR assemblies during manufacturing and, in some implementations, dynamic configuration in the field.

According to another class of applications, a test patch as described herein may be used to monitor and/or compensate for changes in the resistance of the FSR material of an FSR assembly over time and/or in response to environmental conditions. That is, the sensitivity of an FSR assembly may change over time (e.g., with usage) and/or in response to environmental conditions such as temperature or humidity; potentially degrading its effectiveness. By detecting corresponding changes in the resistance of the test patch, these reference measurements may be used to make appropriate adjustments to operating parameters associated with the FSR assembly to compensate for this drift.

Figure 12:
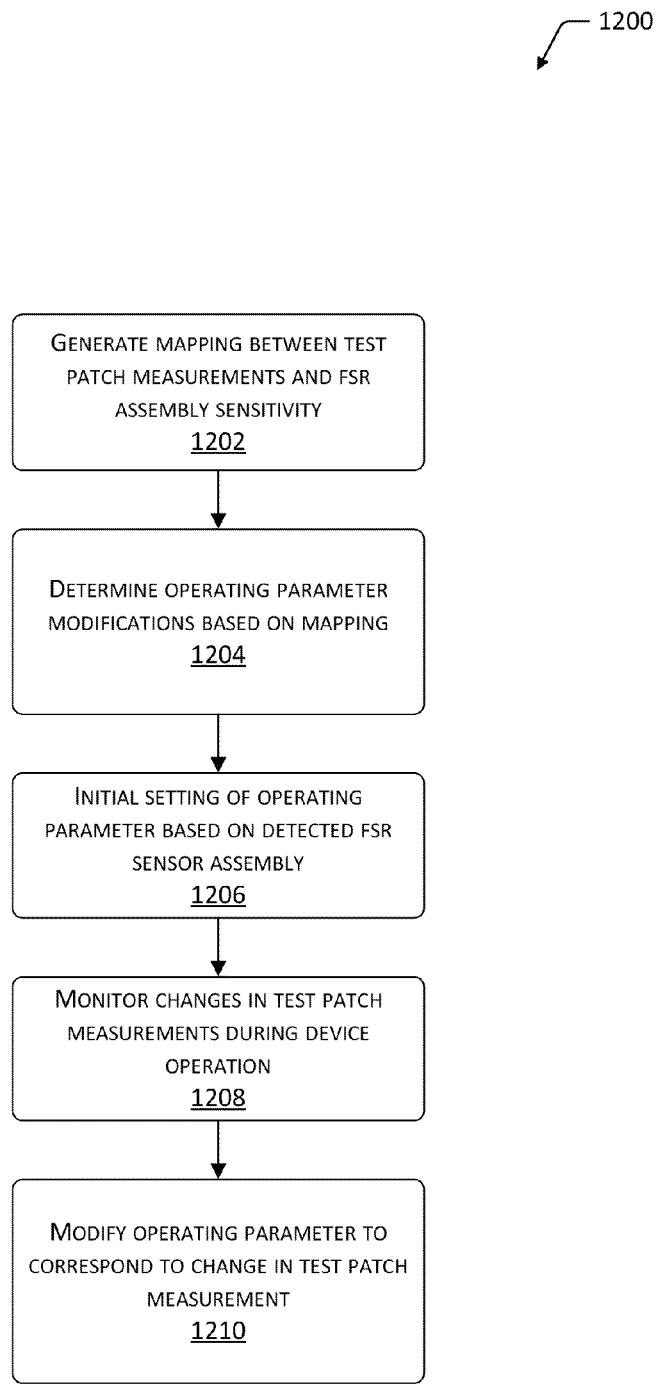
FIG. 12 is a flow chart illustrating a specific technique for monitoring and compensating for sensitivity drift of an FSR assembly.

The flowchart of FIG. 12 illustrates a particular technique for initializing, and then monitoring and compensating for changes in the sensitivity of an FSR assembly such as the one described above with reference to FIGS. 1-11. A mapping between test patch measurements and the sensitivity of the active area(s) of an FSR assembly is generated (1202). This may be done, for example, by taking test patch measurements (e.g., resistance, voltage, current, etc.) at a number of different points in time, after some number of activations of the assembly, and/or under different environmental conditions (e.g., temperature, humidity, pressure, etc.). Measurements representing the sensitivity of the active area might be done in a variety of different ways. For example, voltages on the common conductor (e.g., conductor 406(1)) may be measured both when no force is exerted on the active area, and when a force is exerted on the active area that is sufficient to pull the common conductor up to (or nearly up to) the supply voltage. As will be appreciated, if this difference decreases over time or under certain conditions, this could represent a drift in the sensitivity of the assembly that can then be correlated with corresponding changes in the test patch measurements. This mapping may be done for each FSR assembly, or for a test set of FSR assemblies, the results for which may then be generalized and applied to other assemblies of the same type.

The mapping between test patch measurements and active area sensitivity may then be used to determine how to configure and/or modify one or more operating parameters of the FSR assembly or the device of which it is a component (1204). For example, a new value of pull-down resistor might be mapped to a particular sensitivity measurement that sets or moves the operating point of the FSR assembly back to some preferred point or range. And these operating parameters may then be stored for use in a variety of ways. For example, when a device including such an FSR assembly is manufactured and tested, an initial setting for the operating parameter may be selected (1206) by test equipment, e.g., an initial test patch measurement identifies the type or source of the FSR assembly and a corresponding pull-down resistor is selected from a table which includes multiple values for the identified FSR assembly corresponding to various conditions. Such a table might be stored in test equipment memory, or in the memory of the device itself.

According to some applications, changes in test patch measurements for an FSR assembly in an electronic device (e.g., a tablet or smart phone) may be monitored in the field (1208) (e.g., via the wireless communication capabilities of the device). In response to a sufficiently large change, a corresponding operating parameter modification for the FSR assembly or the device may be made (1210). This might be done, for example, dynamically by sending instructions to the device to select a different pull-down resistor value from a local copy of a table in the device's memory. Alternatively, the device in which the FSR assembly is a component may be configured to detect changes in test patch measurements and automatically modify the operating parameter without external intervention. Suitable alternatives and combinations of these functionalities will be appreciated by those of skill in the art.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A force-sensing resistor (FSR) assembly, comprising:
   an active area characterized by a first resistance, the active area comprising a first element of an FSR material in contact with a plurality of conductive structures, the active area of the FSR assembly being configured such that the first resistance changes in response to force applied to the FSR assembly that affects the contact between the FSR material of the first element and the conductive structures;
   first conductors by which a first measurement relating to the first resistance can be made, each of the first conductors being coupled to the first element by one of the conductive structures;
   a test area characterized by a second resistance, the test area comprising a second element of the same FSR material as the first element of the active area, the test area of the FSR assembly being configured such that the second resistance remains substantially constant in response to force applied to the FSR assembly; and
   second conductors by which a second measurement relating to the second resistance can be made, the FSR material of the second element being applied directly on the second conductors;
   wherein the first conductors include a first supply conductor and a common conductor, and the second conductors include a second supply conductor and the common conductor, and wherein the first element forms part of a first voltage divider, and the second element forms part of a second voltage divider.

2. The FSR assembly of claim 1, wherein the first measurement represents a magnitude of force applied to the FSR assembly.

3. The FSR assembly of claim 1, wherein the second measurement represents a type or manufacturer of the FSR assembly, or a reference for determining changes in sensitivity of the FSR assembly.

4. A method, comprising:
   determining a sensor type of a force-sensing resistor (FSR) assembly of an electronic system, the FSR assembly including an active area characterized by a first resistance, the active area comprising a first element of an FSR material, the active area of the FSR assembly being configured such that the first resistance changes in response to force applied to the FSR assembly, the FSR sensor further including a test area characterized by a second resistance, the test area comprising a second element of the same FSR material as the first element of the active area, the test area of the FSR assembly being configured such that the second resistance remains substantially constant in response to force applied to the FSR assembly, wherein determining the sensor type of the FSR sensor includes making a measurement relating to the second resistance; and
   configuring an operating parameter of the electronic system based on the measurement.

5. The method of claim 4, wherein the first element forms a voltage divider with a pull-down resistance, and wherein configuring the operating parameter of the electronic system comprises selecting the pull-down resistance for the voltage divider.

6. The method of claim 5, wherein selecting the pull-down resistance comprises selecting an entry corresponding to the pull-down resistance and the measurement from a table stored in an associated memory, the table including entries corresponding to a plurality of pull-down resistances and a plurality of measurements relating to the second resistance.

7. A method for compensating for variation of a force-sensing resistor (FSR) assembly due to changes of one or more conditions, the FSR assembly including an active area characterized by a first resistance, the active area comprising a first element of an FSR material, the active area of the FSR assembly being configured such that the first resistance changes in response to force applied to the FSR assembly, the FSR sensor further including a test area characterized by a second resistance, the test area comprising a second element of the same FSR material as the first element of the active area, the test area of the FSR assembly being configured such that the second resistance remains substantially constant in response to force applied to the FSR assembly, the method comprising:

making a first measurement relating to the second resistance while the one or more conditions are in a first state to obtain a first measurement value;

configuring an operating parameter of the FSR assembly to correspond to the first measurement value;

making a second measurement relating to the second resistance while the one or more conditions are in a second state to obtain a second measurement value; and reconfiguring the operating parameter of the FSR assembly to correspond to the second measurement value.

8. The method of claim 7, wherein the one or more conditions include one or more of time, temperature, humidity, or pressure.

9. The method of claim 7, wherein the first element forms part of a voltage divider with one of a plurality of pull-down resistances, and wherein configuring and reconfiguring the operating parameter of the FSR assembly comprises selecting from among the pull-down resistances for the voltage divider.

10. The method of claim 9, wherein selecting from among the one or more pull-down resistances comprises selecting one or more entries from a table stored in an associated memory, the table including entries corresponding to a plurality of pull-down resistances and a plurality of measurement values relating to the second resistance.

11. An electronic device, comprising:
   one or more processors;
   one or more memories;
   one or more displays; and
   one or more force-sensing resistor (FSR) assemblies, each FSR assembly comprising:

an active area characterized by a first resistance, the active area comprising a first element of an FSR material in contact with a plurality of conductive structures, the active area of the FSR assembly being configured such that the first resistance changes in response to force applied to the FSR assembly that affects the contact between the FSR material of the first element and the conductive structures;

first conductors by which a first measurement relating to the first resistance can be made, each of the first conductors being coupled to the first element by one of the conductive structures;

a test area characterized by a second resistance, the test area comprising a second element of the same FSR material as the first element of the active area, the test area of the FSR assembly being configured such that the second resistance remains substantially constant in response to force applied to the FSR assembly; and second conductors by which a second measurement relating to the second resistance can be made, the FSR material of the second element being applied directly on the second conductors.

12. The electronic device of claim 11, wherein the first element forms a voltage divider with one or more of a plurality of pull-down resistances included in the electronic device, and wherein the one or more processors of the electronic device are configured to select from among the pull-down resistances to form the voltage divider.

13. The electronic device of claim 12, wherein the one or more processors are configured to select from among the pull-down resistances by selecting an entry corresponding to one of the pull-down resistances and the second measurement from a table stored in the one or more memories, the table including entries corresponding to the plurality of pull-down resistances and a plurality of measurements relating to the second resistance.

14. The electronic device of claim 11, wherein the one or more processors are configured to make the second measurement and to configure an operating parameter of the electronic device to correspond to the second measurement.

15. The electronic device of claim 11, wherein the first measurement represents a magnitude of force applied to the FSR assembly.

16. The electronic device of claim 11, wherein the second measurement represents a type or manufacturer of the FSR assembly, or a reference for determining changes in sensitivity of the FSR assembly.

17. The electronic device of claim 11, wherein each FSR assembly further comprises:
   a second active area characterized by a third resistance, the second active area comprising a third element of the FSR material in contact with a second plurality of conductive structures, the second active area of the FSR assembly being configured such that the third resistance changes in response to force applied to the FSR assembly; and
   third conductors by which a third measurement relating to the third resistance can be made, each of the third conductors being coupled to the third element by one of the second plurality of conductive structures.

18. The electronic device of claim 11, wherein the conductive structures coupled to the first conductors have complementary interlocking features relative to each other.

19. The electronic device of claim 11, wherein the electronic device is a tablet computing device, and wherein each FSR assembly is an input device of the tablet computing device.

* * * * *